March 12, 1929. R. A. LAIDLAW 1,705,410
BURIAL VAULT
Filed Feb. 4, 1927
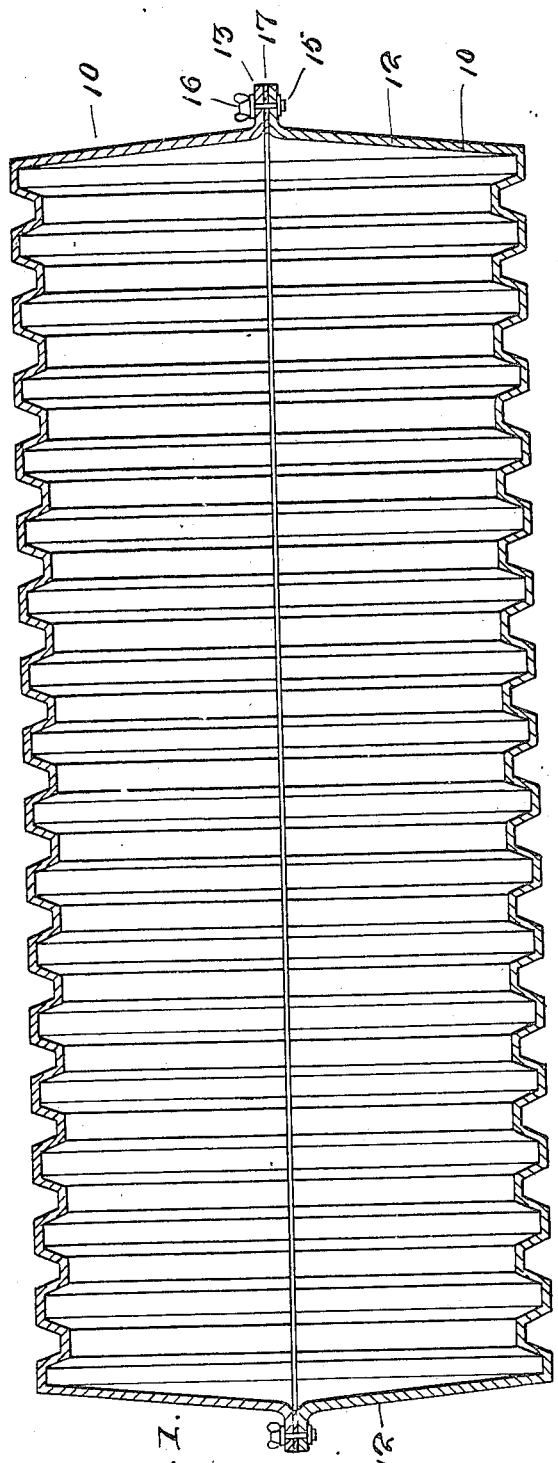
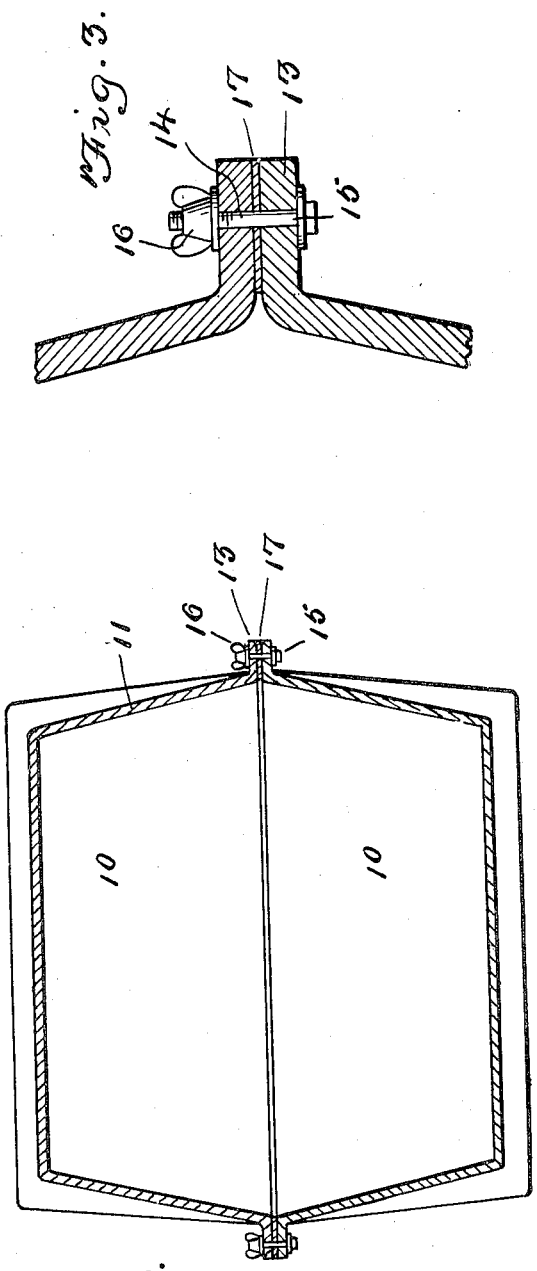
R. A. Laidlaw
INVENTOR
BY Victor J. Evans
ATTORNEY Patented Mar. 12, 1929.

1,705,410

UNITED STATES PATENT OFFICE.

ROBERT A. LAIDLAW, OF SAN ANTONIO, TEXAS, ASSIGNOR OF ONE-FOURTH TO L. T. WRIGHT AND ONE-FOURTH TO J. T. HAILE, OF SAN ANTONIO, TEXAS.

BURIAL VAULT.

Application filed February 4, 1927. Serial No. 165,956.

This invention relates to improvements in underground burial vaults and has for an object the provision of a container which is preferably made of fireproof, waterproof and rotproof material, so that the container will last for an indefinite period.

Another object of the present invention is to provide a container whose walls are corrugated to increase their strength and in addition, are outwardly flared or bulged at the sides and ends of the container to resist inward pressure.

Another object of the invention is the provision of means for effectually sealing the container to exclude air and moisture.

With the above and other objects in view, the invention further includes the following novel features and details of construction, to be hereinafter more fully described, illustrated in the accompanying drawings and pointed out in the appended claim.

In the drawings:—

Figure 1 is a sectional view of a burial vault constructed in accordance with the invention.

Figure 2 is a cross section.

Figure 3 is an enlarged fragmentary section illustrating the manner of sealing the vault.

Referring to the drawings in detail wherein like characters of reference denote corresponding parts, the reference character 10 indicates a pair of substantially trough-shaped complemental members. These members are transversely corrugated, the corrugations extending from one side edge to the other side edge as shown at 11. The side walls of each of the members 10 are outwardly flared and the depth of the corrugations decrease toward the edges of these members. The end walls of the members are also outwardly flared as shown at 12. By corrugating the members and flaring the walls as indicated, resistance to pressure from without is materially increased, so that the walls may be constructed relatively thin.

Extending around the edges of each of the members 10 are flanges 13. These flanges are provided with openings 14 for receiving bolts 15 and the latter are equipped with wing nuts 16. The members 10 may thus be securely connected. It is preferred to provide a gasket 17 between the flanges 13 of the members 10 so as to insure an airtight and leakproof joint.

The invention is susceptible of various changes in its form, proportions and minor details of construction and the right is herein reserved to make such changes as properly fall within the scope of the appended claim.

Having described the invention what is claimed is:—

A burial vault comprising a pair of complemental sections, each section comprising a trough-shaped member, a flange extending outwardly around the edges of said member, continuous corrugations extending transversely of said member along the bottom and opposite sides, the depth of the corrugations gradually diminishing from said bottom toward and being flush at said edges and merging into the flanges, means extending through the flanges to secure the members together and provide a closed container, and a sealing gasket between the flanges.

In testimony whereof I affix my signature.

ROBERT A. LAIDLAW.